United States Patent [19]
Riggio

[11] Patent Number: 5,798,671
[45] Date of Patent: Aug. 25, 1998

[54] CHARGE COUPLED, SILICON CONTROLLED POWER SUPPLY/BATTERY CHARGER

[75] Inventor: Chris A. Riggio, Longmont, Colo.

[73] Assignee: Renaissance Systems, Inc., Longmont, Colo.

[21] Appl. No.: 833,082

[22] Filed: Apr. 4, 1997

[51] Int. Cl.⁶ .................................................. H01M 10/46
[52] U.S. Cl. ........................................................ 320/128
[58] Field of Search ................................ 320/118, 128, 320/129, 135, 140, 143, DIG. 28, DIG. 31, DIG. 32, 104, 127, 148, 158; 363/123, 125, 126, 127, 128

[56] References Cited

U.S. PATENT DOCUMENTS

| | | | |
|---|---|---|---|
| 4,716,353 | 12/1987 | Engelmann | 320/139 |
| 4,779,035 | 10/1988 | Engelmann | 320/139 |
| 5,124,906 | 6/1992 | Kang | 363/21 |
| 5,270,913 | 12/1993 | Limpaecher | 363/140 |
| 5,646,502 | 7/1997 | Johnson | 307/66 |

*Primary Examiner*—Edward Tso
*Attorney, Agent, or Firm*—William E. Hein

[57] ABSTRACT

A series or shunt configured battery charger/power supply circuit employs capacitors for charge coupling to the AC line and semiconductors as low power dissipation control elements to achieve good DC output voltage and current regulation with increased efficiency, while reducing cost, size, and weight.

12 Claims, 4 Drawing Sheets

CHARGE COUPLED, SILICON CONTROLLED POWER SUPPLY/BATTERY CHARGER

BACKGROUND AND SUMMARY OF THE INVENTION

This invention relates generally to power supply and battery charger circuits and, more particularly, to an improved power supply/battery charger that exhibits lower power dissipation, minimal RFI emission, and superior power regulation characteristics, that is lighter and less expensive than conventional power supply/battery charger circuits.

Two major types of AC/DC power supplies and battery chargers are currently being utilized in the microelectronics industry. These are known generally as transformer/linear and switching types of power supplies. Transformer power supplies are the oldest type. They exhibit high reliability, good line isolation, predictable performance, and long service life. However, they are typically heavy and expensive, lack packaging flexibility, and exhibit high heat dissipation and low regulating precision. Transformer power supplies are generally 60–80% efficient and, like switching power supplies, are also used in battery charging applications.

With the advent of solid state electronics in the 1960's, the switching power supply evolved. By the late 1970's, they had gained wide technical and commercial acceptance. Switching power supplies use transistors to excite transformers to produce current generating magnetic fields. They have overtaken transformers in overall power supply market share due to their superior regulating characteristics, lower cost per watt, higher power density per size and weight, and wider input voltage tolerance. However, they suffer from high component count and complexity, lower reliability, and short service life. Switching power supplies are typically 70–90% efficient.

It is therefore the principal object of the present invention to provide a power supply/battery charger whose operating efficiency can approach 100%.

It is a further object of the present invention to provide a power supply/battery charger in which the combination of capacitor insulation and semiconductor blocking voltage serve to provide electrical isolation.

These and other objects are accomplished in accordance with the illustrated preferred embodiments of the present invention by employing capacitors for charge coupling to the AC line and semiconductors as low power dissipation control elements to achieve good DC output voltage and current regulation with increased efficiency and at reduced cost, size, and weight.

The power supplies/battery chargers of the present invention may be either series or shunt configured. The shunt configuration exhibits enhanced resistance to AC line disturbances since disturbances of sufficient magnitude trigger the thyristor to shunt any excess power into the coupled system. The shunt configuration exhibits higher losses and some RFI under no load conditions, with minimal losses at full load. A basic shunt configuration power supply circuit includes a semiconductor coupled in series with a metalized film or other capacitor having a sufficient voltage rating and capacitance to provide usable load current. An AC input voltage is impressed across the series combination of the thyristor and capacitor such that the capacitor is forced to charge during the portion of each AC input voltage cycle in which the thyristor is in the conducting state. Other embodiments of the present invention utilize the voltage drop across the thyristor as a phase correct current source for direct gating of the thyristor. A bilater trigger diac or two zener diodes connected back-to-back may be drop coupled to achieve symmetrical gating currents from the AC line. Other conventional gate control arrangments may be employed, depending on the desired output response. The DC output voltag can be more precisely controlled by utilizing conventional output voltage feedback arrangements and/or voltage reference techniques. The AC or rectified DC output voltage level resulting from this configureation is governed by the gate triggering threshold voltage. The DC output voltage results from rectifying the AC voltage that appears across the thyristor or at any other desired point in the circuit. Conventional rectification and output filtering are employed.

The series configuration of the power supply/battery charger circuits of the present invention result in no power loss under no load condtions. In the basic series circuit, a load or storage element is coupled in series with a capacitor to the AC line. Using conventional feedback arrangements for gate control, series coupled thyristors are employed to shuttle charge to load or storage elements such as capacitors or batteries. The basic series configuration may be enhanced by employing selectively triggered silicon devices to effect electrical separation of load and charging elements. Power supply isolation is achieved by shuttling storage elements in a rotation for constant load support with simultaneous charging. By correctly sequencing the conduction of silicon control elements, continuous load current can be supplied while simultaneously maintaing the charge status of alternate cells. Loads are effectively isolated from the AC line coupled portion of the circuitry by alternating charge and discharge cycles. All of these embodiments can be staged for multiple outputs and scaled for large loads. System dissipation can be calculated by multiplying the in phase RMS current being controlled by the in phase RMS voltage drop across the coupled system during charge cycle conduction.

Using the basic shunt or series types of power supplies of the present invention, other configurations can be derived to form multiple power supplies of any polarity, reference or combination. Combinations of other electrically or magnetically active coupling elements, such as inductors, reactors, piezo electric elements, silicon devices, super conductors, and negative impedance devices, for example, may be incorporated. Logic chips may be incorporated in the basic shunt or series power supply circuits to create custom performance features and to integrate them with computer software and hardware.

DETAILED DESCRIPTION OF THE PREFERRED EMBODIMENTS

Figure 1:
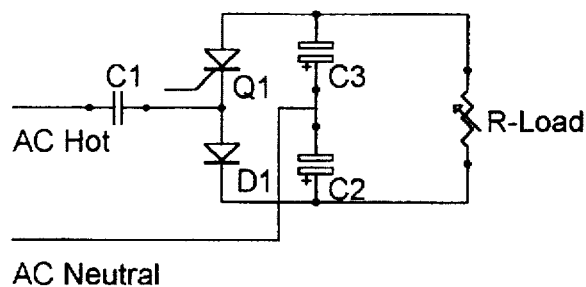
FIG. 1 is a detailed circuit diagram of a two junction series regulated thyristor controlled charge coupled power supply in accordance with the present invention.

Referring now to the power supply circuit of FIG. 1, a capacitor C1 forms a line coupled current source that supplies a charge current to a pair of capacitors C2, C3. When thyristor Q1 is in the conducting state, capacitors C2 and C3 form a return path to the AC line neutral through a diode D1 and thyristor Q1. The gate of thyristor Q1 is enabled or disabled by conventional feedback means so as to maintain a desired DC output voltage. When thyristor Q1 is in the blocking state, capacitors C2 and C3 are discharged through a load R-load. A current path formed by diode D1 and capacitor C3 causes capacitor C1 to charge to the AC line half-cycle peak value until thyristor Q1 is gated on by the feedback means. As the DC output voltage is reduced by the flow of load current through R-load, conduction through thyristor Q1 resumes, and DC output voltage is maintained.

Figure 2:
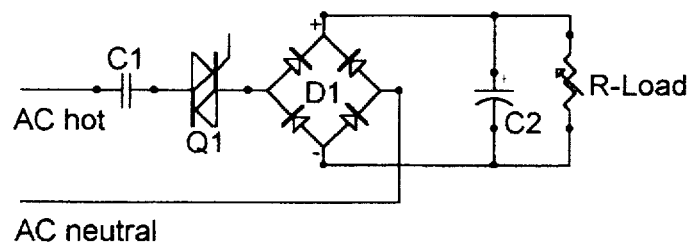
FIG. 2 is a detailed circuit diagram of a six junction embodiment of the power supply of FIG. 1.

Referring now to FIG. 2, there is shown a multi-junction embodiment of the power supply of FIG. 1 which permits the use of a single output capacitor C2 at the expense of slightly higher power dissipation due to the additional junctions. When thyristor Q1 is in the conducting state, capacitor C2 is charged to a desired voltage. When the desired output voltage is reached, conventional feedback is used to disable gating of thyristor Q1. As load current is drawn from capacitor C2, the resulting output voltage drop enables the gating of thyristor Q1 to maintain the desired output voltage.

Figure 3A:
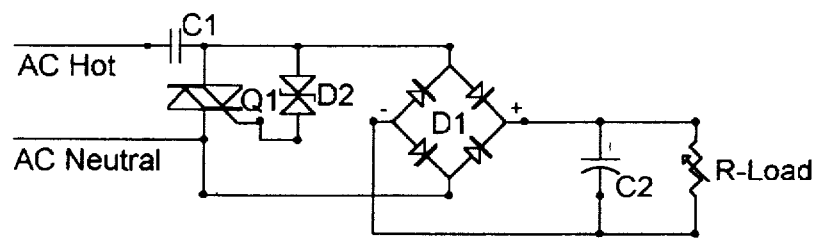
FIG. 3A is a detailed circuit diagram of a shunt type thyristor controlled charge coupled power supply in accordance with the present invention.

Referring now to FIG. 3A, there is shown a shunt type thyristor contolled charge couple power supply in which a thyristor Q1 forms a shunt regulated AC source with a capacitor C1. In this circuit, a a diac or two back-to-back zener diodes D2 are used to limit the output voltage at capacitor C1 by biasing thyristor Q1 in conduction. When the voltage drop across thyristor Q1 reaches the .zener voltage, every half cycle, the diode combination D2 serves to current bias the gate of thyristor Q1, thereby forcing capacitor C1 to charge until the current across thyristor Q1 approaches zero. Thyristor Q1 returns to its blocking state at zero current, thereby allowing the voltage across it to increase until the diode combination D2 is triggered and the cycle repeats. In practice, this circuit self-commutates several times during each half cycle of impressed AC line voltage. The voltage drop across thyristor Q1 becomes a voltage/current source for diode D1. Capacitor C2 is fed by diode D1 to form a voltage regulated current source for load support.

Figure 3B:
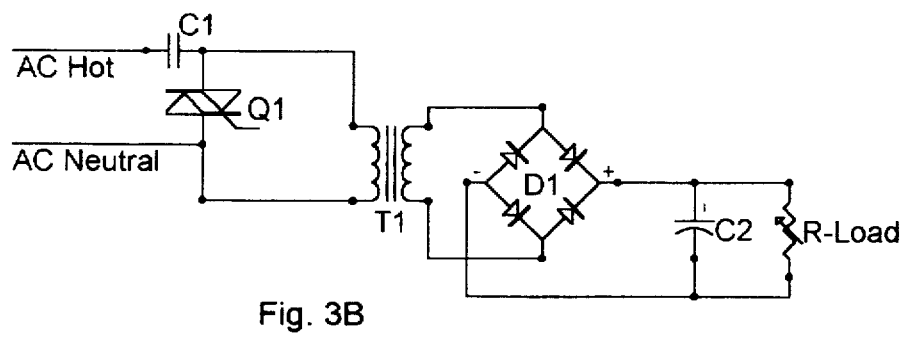
FIG. 3B is a detailed circuit diagram of the power supply of FIG. 3A in which a transformer has been added to provide AC line isolation.

Referring now to FIG. 3B, there is shown the power supply circuit of FIG. 3A with the addition of a transformer T1, whose secondary winding provides AC line isolation and whose primary winding forms a tank circuit with capacitor C1 through thyristor Q1. As in the circuit of FIG. 3A, conventional feedback means is employed to control thyristor Q1, resulting in modulated excitation of transformer T1.

Figure 4A:
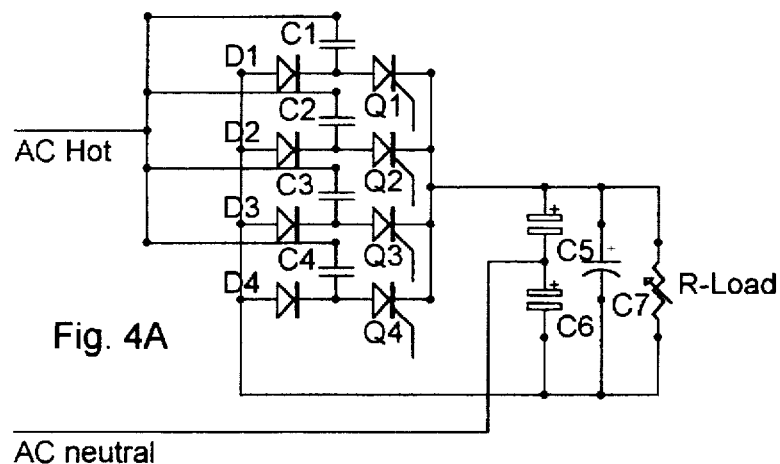
FIG. 4A is a detailed circuit diagram of a multi-stage embodiment of the power supply of FIG. 1.

Referring now to FIG. 4A, there is shown an expanded embodiment of the power supply circuit of FIG. 1 in which multiple thyristor, diode, and capacitor stages are employed to provide dynamic response to rapidly changing load conditions by activating additional stages. In this way, the desired output voltage level can be maintained precisely within the design current band. Thyristors Q1, Q2, Q3, Q4 are latched into their conducting states in a staged manor using an output feedback arrangement to effect the coupling of load proportional line current from capacitors C1, C2, C3, C4 in order to sustain good output voltage regulation. Capacitors C1, C2, C3, C4 can be sized and stages added to meet any load requirements. Stage specific feedback can be implemented using a variety of conventional coupling arrangements. A typical power supply can be configured by developing an amplified error signal from the DC output voltage. When the DC output voltage deviates from a desire level, the error signal drives the gating sequence of thyristors Q1, Q2, Q3, Q4 to maintain precise regulation. A pair of capacitors C5, C6 serve to store energy from opposite line cycles, while an output capacitor C7 serves to sum and filter the DC output voltage, as well as to assist in balancing the voltage across capacitors C5 and C6.

Figure 4B:
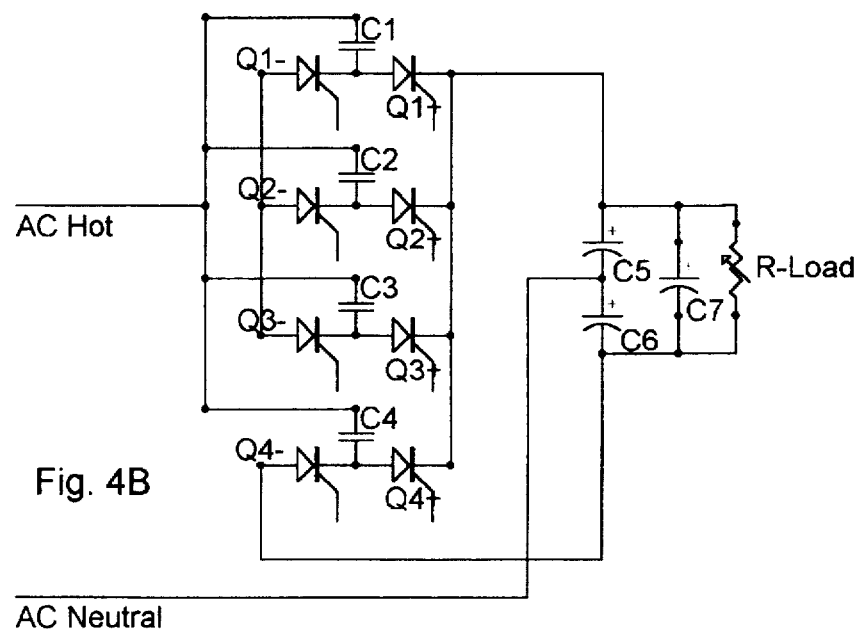
FIG. 4B is a detailed circuit diagram of the power supply of FIG. 4A in which silicon controlled rectifiers replace diodes.

Referring now to FIG. 4B, there is shown the power supply circuit of FIG. 4A in which diodes D1, D2, D3, D4 are replaced by thyristors Q1-, Q2-, Q3-, Q4- to permit complete ACbalance control and AC line isolation.

Figure 5A:
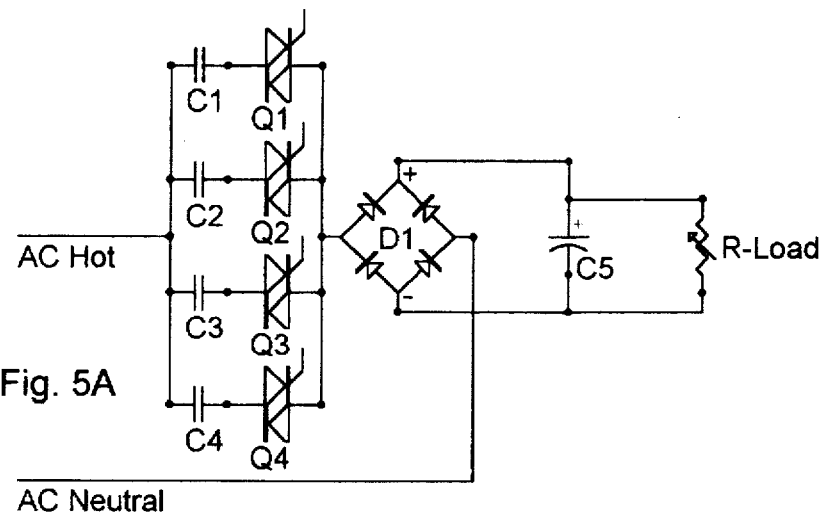
FIG. 5A is a detailed circuit diagram of a multi-stage embodiment of the power supply of FIG. 2.

Referring now to FIG. 5A, there is shown a power supply circuit that represents a multi-stage embodiment of the circuit of FIG. 2, but that is operationally similar to that of FIG. 4A. In this circuit, thyristors Q1, Q2, Q3, Q4 serve to couple the current flowing from capacitors C1, C2, C3, C4 to diode combination D1 on demand using a voltage feedback regulating strategy as described above in connection with the circuits of FIGS. 4A and 4B. An output capacitor C5 provides regulated load current to a load R-load.

Figure 5B:
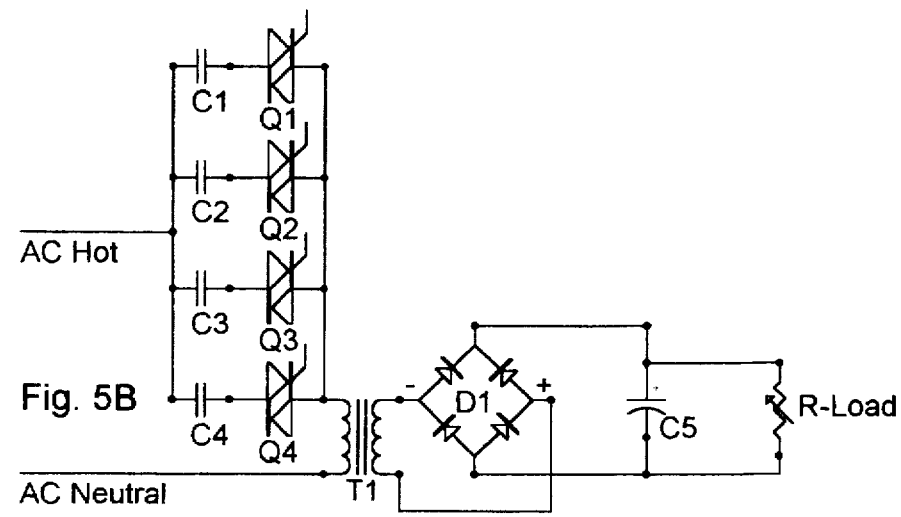
FIG. 5B is a detailed circuit diagram of the power supply of FIG. 5A in which a transformer has been added to provide AC line isolation.

Referring now to FIG. 5B, there is shown the power supply circuit of FIG. 5A in which a transformer T1 has been added to provided isolation of the DC output voltage from the AC line voltage. The primary winding of transformer T1 is selectively excited by thyristors Q1, Q2, Q3, and Q4.

Figure 6A:
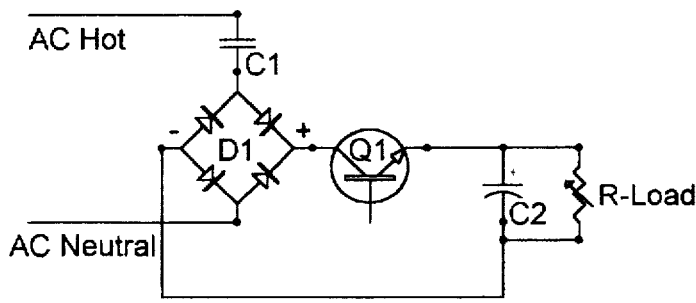
FIG. 6A is a detailed circuit diagram of a transistor controller power supply in accordance with the present invention.

Referring now to FIG. 6A, there is shown a power supply circuit in which transistor coupling is employed. A transitor, Q1 is feedback biased to provide a constant voltage across output capacitor C2 under variable load conditions, up to the maximum current supplied by a capacitor C1. A diode combination D1 serves to rectify the AC line voltage.

Figure 6B:
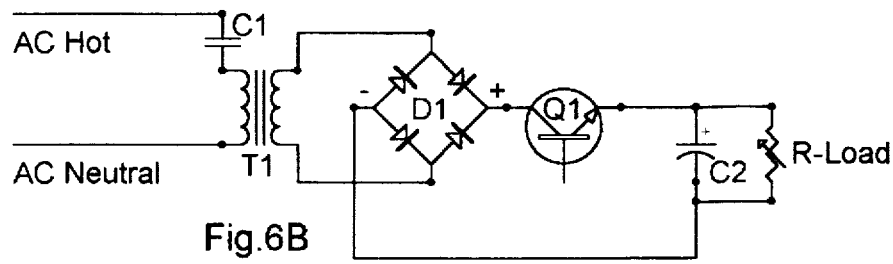
FIG. 6B is a detailed circuit diagram of the power supply of FIG. 5A in which a transformer has been added to provide AC line isolation.

Referring now to FIG. 6B, there is shown the power supply circuit of FIG. 6A with the addition of a transformer T1 to provide isolation of the DC output voltage from the AC line.

Figure 7:
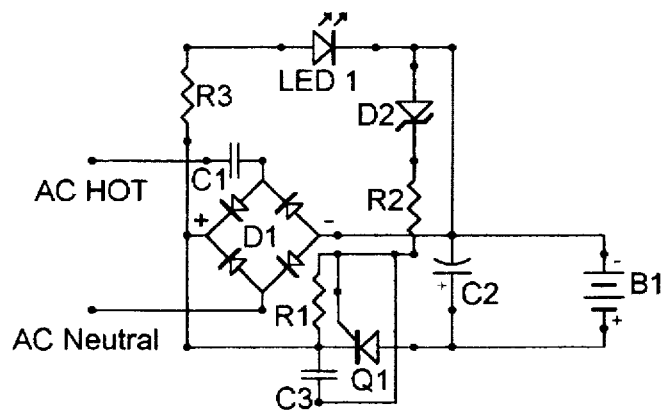
FIG. 7 is a detailed circuit diagram of a battery charger in accordance with the present invention.

Referring now to FIG. 7, there is shown a battery charger circuit in which a rectified current source formed by a capacitor C1 and a diode combination D1 provides charging current to a battery B1 through a thyristor Q1. Thyristor Q1 is gated into its conduction state by a resistor R1 when the voltage across battery B1 drops to a certain level. Thyristor Q1 remains in the conduction state until the zener voltage of a zener diode D2 is reached. This produces an opposing current through a resistor R2 to the gate of thyristor Q1.

When battery B1 is fully charged, the opposing current flowing through diode D2 and resistor R2 cancels the gating current flowing through resistor R1 and allows thyristor Q1 to turn off as the current flowing through it reaches zero. A capacitor C2 serves to decouple noise and stabilizes the gating of thyristor Q1. A capacitor C4 prevents circuit oscillation when battery B1 is removed. A light emitting diode LED1 indicates the state of thyristor Q1. When thyristor Q1 is in the conducting state, the voltage across diode D1 is low so that diode LED1 will not receive current from a resistor R3, thereby indicating that charging is in process. When thyristor Q1 is in the blocking state, the voltage across diode D1 is high, and diode LED1 is biased to illuminate, thereby indicating that charging of battery B1 is complete. This circuit permits customization of the output voltage levels that trigger thyristor Q1 by varying the values of resistors R1, R2 and diode D2. Other conventional feedback configurations for controlling thyristor Q1 may be employed to accomodate the diverse charging requirements of various types of batteries.

Figure 8:
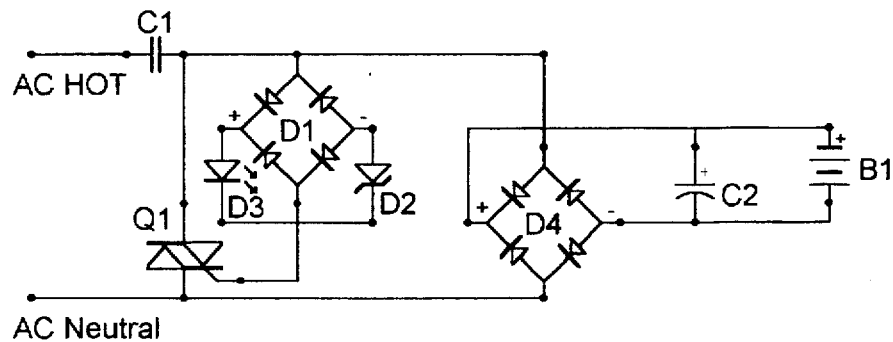
FIG. 8 is a detailed circuit diagram of a shunt regulated thyristor controlled charge coupled battery charger in accordance with the present invention.

Referring now to FIG. 8, there is shwon a shunt regulated thyristor controlled charge coupled battery charging circuit in which a pair of diodes D2, D3 form a zener regulated shunt across the output of a diode combination D1 to cause a thyristor Q1 to be gated into conduction. The combined values of diode combination D1 and diodes D2, D3 determine the voltage rise across thyristor Q1 just before latching occurs. When thyristor Q1 is latched, the current flow to a diode combination D4 ceases, a capacitor C1 charges, and power is conserved, except for that dissipated in thyristor Q1. When thyristor Q1 is in the blocking state, diode combination D4 shares current flowing through capacitor C1. The output of diode combination D4 charges a capacitor C2 and a battery B1 to the voltage allowed by thyristor Q1. This process is repeated as the polarity of the AC line voltage alternates. A light emitting diode D3 visually indicates the state of thyristor Q1.

I claim:

1. A charge coupled DC power supply circuit connected to an AC line, the circuit comprising:

a first capacitor having first and second terminals, the first terminal being connected to a hot side of the AC line;

a power semiconductor device and a diode connected in series, the second terminal of said first capacitor being connected between said power semiconductor device and said diode; and second and third capacitors connected in series, the series combination thereof being connected across the series combination of said power semiconductor device and said diode, the series combination of said second and third capacitors serving as an output of said power supply circuit;

a neutral side of the AC line being connected between said series combination of said second and third capacitors.

2. A DC power supply circuit as in claim 1 wherein said power semiconductor device comprises a thyristor.

3. A charge coupled DC power supply circuit connected to an AC line, the circuit comprising:

a first capacitor having first and second terminals, the first terminal being connected to a hot side of the AC line;

a power semiconductor device having first and second power terminals, the first power terminal being connected to the second terminal of said first capacitor;

a bridge rectifier having first and second input terminals and first and second output terminals, the first input terminal being connected to the second power terminal of said power semiconductor device and the second input terminal being connected to a neutral side of the AC line, said first and second output terminals serving as an output of said power supply circuit; and a second capacitor connected across said first and second output terminals of said bridge rectifier.

4. A DC power supply circuit as in claim 3, wherein said power semiconductor device comprises a thyristor.

5. A charge coupled DC power supply circuit connected to an AC line, the circuit comprising:

a first capacitor having first and second terminals, the first terminal being connected to a hot side of the AC line;

a power semiconductor device having first and second power terminals and a control terminal, the first power terminal being connected to the second terminal of said first capacitor, and the second power terminal being connected to a neutral side of the AC line;

biasing means connected between said first power terminal and said control terminal of said power semiconductor device;

a bridge rectifier having first and second input terminals and first and second output terminals, the first input terminal being connected to the first power terminal of said power semiconductor device and the second input terminal being connected to the neutral side of the AC line, said first and second output terminals serving as an output of said power supply circuit; and a second capacitor connected across said first and second output terminals of said bridge rectifier.

6. A DC power supply circuit as in claim 5, wherein said power semiconductor device comprises a thyristor.

7. A DC power supply circuit as in claim 5, wherein said biasing means comprises a diac.

8. A DC power supply circuit as in claim 5, wherein said biasing means comprises a pair of zener diodes connected back to back.

9. A charge coupled DC power supply circuit connected to an AC line, the circuit comprising:

a first capacitor having first and second terminals, the first terminal being connected to a hot side of the AC line;

a power semiconductor device having first and second power terminals, the first power terminal being connected to the second terminal of said first capacitor and the second power terminal being connected to a neutral side of the AC line;

a transformer having primary and secondary windings, said primary winding being connected across said power semiconductor device;

a bridge rectifier having first and second input terminals and first and second output terminals, the first and second input terminal being connected across the secondary winding of said transformer, said first and second output terminals serving as an output of said power supply circuit; and a second capacitor connected across said first and second output terminals of said bridge rectifier.

10. A DC power supply circuit as in claim 9, wherein said power semiconductor device comprises a thyristor.

11. A charge coupled DC power supply circuit connected to an AC line, the circuit comprising:

a plurality of input stages connected in parallel, each input stage comprising a first capacitor having first and second terminals, the first terminal being connected to a hot side of the AC line; a power semiconductor device and a diode connected in series, the second terminal of said first capacitor being connected between said power semiconductor device and said diode;

second and third capacitors connected in series, the series combination thereof being connected across the series combination of said power semiconductor device and said diode of each of said plurality of input stages, a neutral side of the AC line being connected between said series combination of said second and third capacitors; and a fourth capacitor connected across the series combination of said second and third capacitors, the fourth capacitor serving as an output of said power supply circuit.

12. A DC power supply circuit as in claim 11, wherein said power semiconductor device of each of said plurality of input stages comprises a thyristor.

* * * * *